(12) United States Patent
Odagiri

(10) Patent No.: US 8,253,963 B2
(45) Date of Patent: *Aug. 28, 2012

(54) PRINTING CONTROL SYSTEM

(75) Inventor: Hiroshi Odagiri, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,304

(22) Filed: Feb. 13, 2012

(65) Prior Publication Data

US 2012/0140282 A1 Jun. 7, 2012

Related U.S. Application Data

(63) Continuation of application No. 12/703,357, filed on Feb. 10, 2010, now Pat. No. 8,149,444, which is a continuation of application No. 10/977,099, filed on Oct. 28, 2004, now Pat. No. 7,679,762.

(51) Int. Cl.
 G06F 3/12 (2006.01)
 G06K 15/00 (2006.01)
(52) U.S. Cl. ..................................... 358/1.15; 358/1.14
(58) Field of Classification Search .................. None
 See application file for complete search history.

(56) References Cited

U.S. PATENT DOCUMENTS

| 6,115,132 | A | 9/2000 | Nakatsuma et al. |
| 6,585,344 | B2 | 7/2003 | Kolodziej |
| 7,853,160 | B2 * | 12/2010 | Koitabashi ..................... 399/24 |
| 7,916,316 | B2 * | 3/2011 | Saikawa ..................... 358/1.14 |
| 2010/0214602 | A1 | 8/2010 | Moriwaki |

FOREIGN PATENT DOCUMENTS

| JP | 5-134827 | 6/1993 |
| JP | 5-246551 | 9/1993 |
| JP | 2002-284393 | 10/2002 |
| JP | 2002-321843 | 11/2002 |

* cited by examiner

*Primary Examiner* — Dov Popovici
(74) *Attorney, Agent, or Firm* — SoCal IP Law Group LLP; Steven C. Sereboff; John E. Gunther

(57) ABSTRACT

A print system in which a printer and a client personal computer are connected to a network. The printer may include a storage unit configured to store a residual quantity information of sheets of paper in a paper feed cassette, a communication unit configured to transmit the residual quantity information to the client personal computer, and a printing unit. The client personal computer may include a generation unit configured to generating print data corresponding to a print job, and a control unit configured to acquire the residual quantity information and a number of sheets of paper necessary for the print job and compare the residual quantity information and the number of sheets of paper necessary. Upon judging an occurrence of exhaustion of sheets of paper according to a comparison result, the control unit may notify a user before starting printing in the printer.

18 Claims, 6 Drawing Sheets

Fig. 4

| CASSETTE N SETTING THE NO. OF SHEETS | |
|---|---|
| CASSETTE N ADDITIONAL | 500 |
| CASSETTE N RESIDUAL | 500 |
| OK | |

Fig. 5

SHEETS MAY BE EXHAUSTED DURING PRINTING.
PRINTING CONTINUED?

OK    CANCEL

Fig. 6

PRINT JOB

| Document | Status | Owner | Size |
|---|---|---|---|
| Job1 | Pninting | H.Yamamoto | 212KB |
| Job2 | Waiting | T.Yamada | 80KB |
| Job3 | Waiting | H.Kato | 1200KB |
| Job4 | Warning(PaperOut!) | T.Suzuki | 120KB |

PRINTING CONTROL SYSTEM

RELATED APPLICATION INFORMATION

This is a continuation application of U.S. patent application Ser. No. 12/703,357 filed Feb. 10, 2010 entitled, "Printing Control System", which is a continuation of application Ser. No. 10/977,099 filed Oct. 28, 2004 entitled, "Printing Control System", now U.S. Pat. No. 7,679,762, the full contents of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to a print system mainly composed of a printer having a paper feeder and a client personal computer.

2. Description of the Related Art

There is a printer available that a feed unit is equipped with a multi-stage paper feed cassette mounting sheets of paper of various sizes and in different directions and a paper feed cassette can be automatically selected according to the size of an image. In the printer mounting a multi-stage paper feed cassette, as a process when sheets of paper are exhausted during execution of the print job, a method for suspending the print job and requesting supply of sheets of paper to an operator or a method for supplying sheets of paper from another paper feed cassette to continue the print job is used.

For example, a method for confirming the residual quantity of sheets of paper set in a paper feed cassette, checking whether sheets of paper to be used are sufficient or not, always reserving a sufficient amount of sheets of paper in the paper feed cassette, thereby preventing suspension of the operation due to exhaustion of sheets of paper during execution of the print job is disclosed in Japanese Patent Application 2002-284393.

In this case, the printer body controls information of residual amount of sheets of paper and compares the residual amount with the number of sheets necessary to print. Although a state that sheets of paper are exhausted during one print job can be prevented, only after print data is all sent from the printer driver to the printer body, error information of exhausted sheets of paper can be decided. Moreover, unless a user comes to the printer body for confirmation, he cannot know the occurrence state of exhaustion of sheets of paper.

Further, when a plurality of users share the same printer and a plurality of print jobs and heavy print jobs are spooled simultaneously, a problem arises that unless these spooled print jobs are all executed, a state of whether exhaustion of sheets of paper occurs or not is unknown.

Therefore, an easily operable printer is desired.

SUMMARY OF THE INVENTION

According to embodiments of the present invention, an object of the present invention is to provide a print system capable of finding during printing whether shortage of sheets of paper occurs or not from a client personal computer before starting printing.

The present invention may provide a print system, in which a printer and a client personal computer are connected to a network, wherein:
the printer comprises :
a storage unit configured to store a residual quantity information of sheets of paper in a paper feed cassette;
a communication unit configured to transmit the residual quantity information to the client personal computer;
a printing unit, and
the client personal computer comprising:
a generation unit configured to generating print data corresponding to a print job and
a control unit configured to acquire the residual quantity information and a number of sheets of paper necessary for the print job and compare the residual quantity information and the number of sheets of paper necessary, and when judging an occurrence of exhaustion of sheets of paper according to a comparison results, notifying it to a user before starting printing in the printer.

BRIEF DESCRIPTION OF THE DRAWINGS

Further objects and advantages of the invention can be more fully understood from the following detailed description taken in conjunction with the accompanying drawings, in which:

FIG. 4 is a setting screen example of the number of sheets of paper of a paper feed cassette displayed on a control panel of a printer, FIG. 5 is a pop-up screen example displayed on the client personal computer when a print job is executed from the client personal computer, FIG. 6 is a print spooler screen example displayed on the client personal computer when a print job is executed from the client personal computer.

DETAILED DESCRIPTION OF THE INVENTION

Hereinafter, an embodiment of the present invention will be explained with reference to the accompanying drawings.

Figure 1:
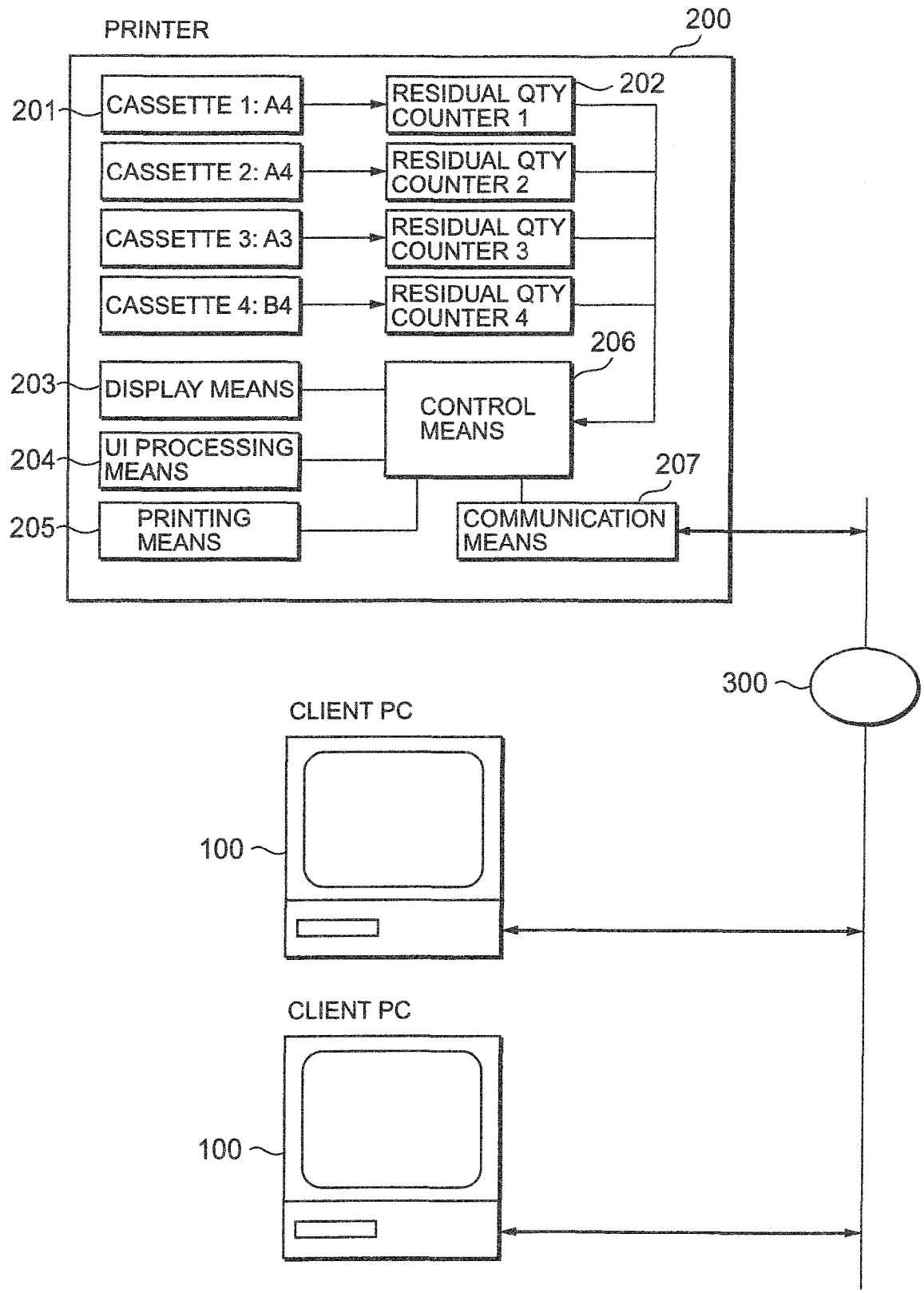
FIG. 1 is a block diagram showing the constitution of the print system relating to the embodiment of the present invention.

FIG. 1 is a block diagram for explaining the system configuration of the print system relating to the embodiment. As shown in FIG. 1, the print system is composed of a client personal computer 100, a printer 200, and a network 300 for connecting them. The printer 200 is composed of, for example, a plurality of paper feed cassettes 201 for storing various sheets of paper, a residual quantity counter 202, a display means 203, a user interface (UI) processing means 204, a printing means 205, a control means 206, and a communication means 207.

The control means 206 of the printer 200 has, for example, a printer CPU, a ROM, a system bus, a RAM, and a memory controller (MC) (all not shown in the drawing). The printer CPU, on the basis of a control program stored in the ROM or a control program stored in an external memory, realizes various kinds of control for the printer 200. For example, the printer CPU outputs an image signal as output information to the printing means 205 connected to the system bus. Furthermore, in the program area of the ROM, the control program of the printer CPU is stored. In the font area of the ROM, font data used to generate output information is stored. In the data area of the ROM, when a printer having no external memory such as a hard disk is used, information used by the client personal computer is stored.

A printer CPU can perform a communication process with the client personal computer 100 via the communication means 207 and is structured so as to notify information in the printer 200 to the client personal computer 100. The RAM functions as a main memory and a work area of the printer CPU.

The memory controller controls access of an external memory such as a hard disk (HD) or an IC card. The external memory is optionally connected and is preferably structured so as to store font data, an emulation program, and form data.

Further, the display means 203 installed in the printer 200 displays operation contents of a user and the status of the printer 200 and is arranged as a switch for various operations and an LED indicator.

The UI processing means 204 serves as an interface with an instruction and input from a user.

One or a plurality of paper feed cassettes 201 can be mounted. In FIG. 1, two paper feed cassettes 201 setting sheets of paper of size A4, one paper feed cassette setting sheets of paper of size A3, and one paper feed cassette setting sheets of paper of size B4, four paper feed cassettes in total are arranged. Further, the paper feed cassettes can store sheets of paper in different directions. Further, a control means for rotating data printed on sheets of paper fed from a paper feed cassette in a different direction in a 90° arc can be installed. For rotation of print data, a well-known art can be used, though it is not the main object of the present invention, so that it will be omitted.

In each of the paper feed cassettes 201, the residual quantity counter 202 for counting the number of sheets of paper stored in the paper feed cassette at present is mounted. The residual quantity counter 202 may be composed of, for example, a presettable nonvolatile memory.

Detection of the residual quantity of sheets of paper is not limited to such a residual quantity counter. For example, it is possible to install a plurality of sensors in each paper feed cassette, detect the upper and lower bottom plates of the paper feed cassette, and convert into the rough number of sheets of paper. Further, it is possible to lift up the bottom plate of the paper feed cassette by the pulse motor and convert the number of pulses until the bottom plate makes contact with the paper feed roller into the number of sheets of paper.

Figure 2:
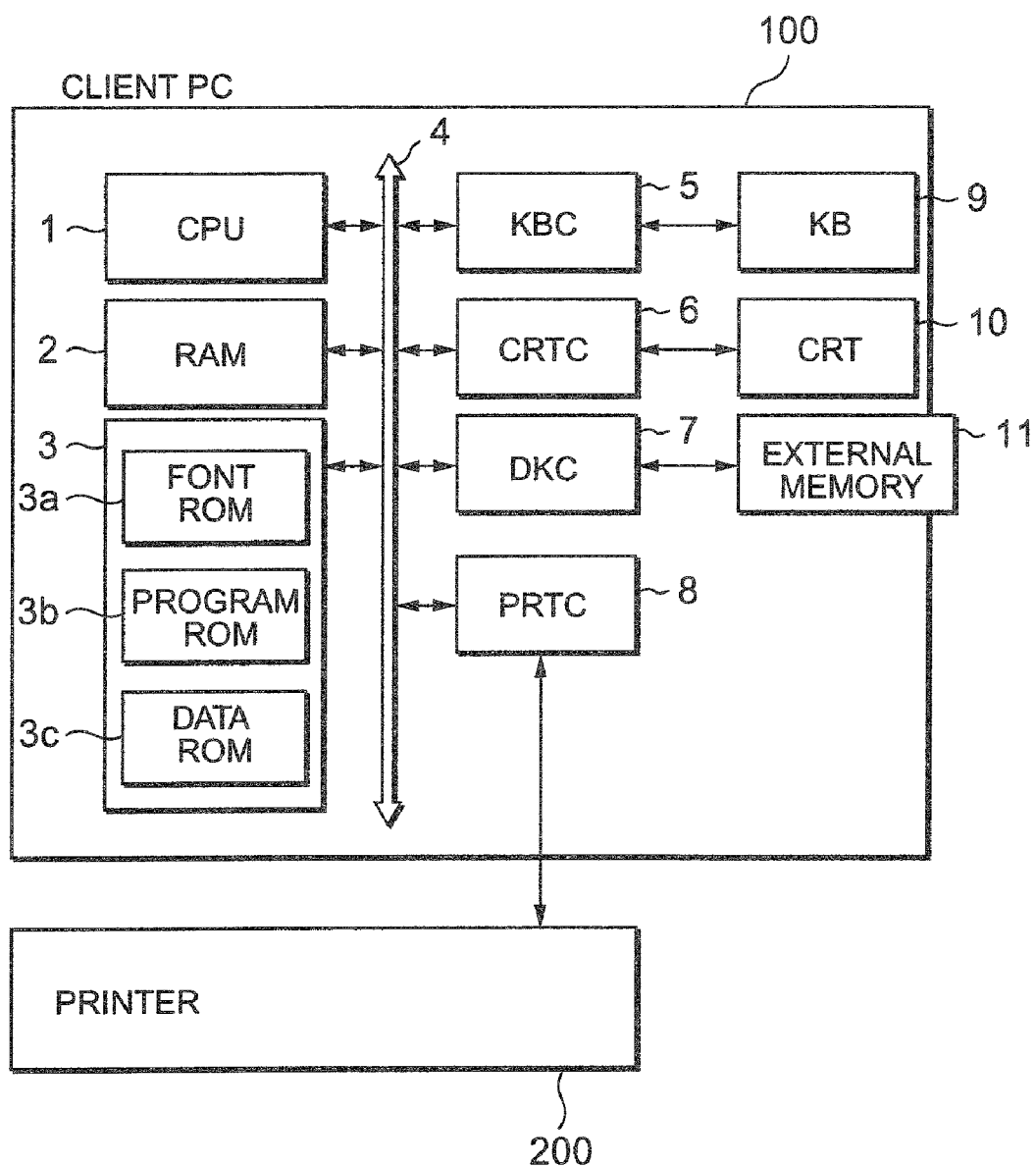
FIG. 2 is a block diagram showing a constitution example of the client personal computer relating to the embodiment of the present invention.

FIG. 2 is a block diagram showing a constitution example of the client personal computer 100 relating to the embodiment of the present invention. As shown in FIG. 2, the client personal computer 100 is composed of, for example, a CPU 1, a RAM 2, a ROM 3, a system bus 4, KBC 5, CRTC 6, DKC 7, PRTC 8, KB 9, and CRT display 10. The CPU 1 realizes various processes of the client personal computer 100. For example, the CPU 1, on the basis of a document processing program stored in a program ROM 3b of the ROM 3 or an external memory 11, executes a document process including graphics, images, characters, and tables (table calculations included). Furthermore, the CPU 1 synthetically controls the devices connected to the system bus 4.

In the program ROM 3b of the ROM 3 or the external memory 11, an operating system program (hereinafter abbreviated to OS) which is a control program of the CPU 1 is stored. The embodiment of the present invention can correspond to a multiclient without depending on the OS kind. In a font ROM 3a of the ROM 3 or the external memory 11, font data used to perform the document process is stored. In a data ROM 3c of the ROM 3 or the external memory 11, various data used to perform the document process is stored.

The RAM 2 functions as a main memory and a work area of the CPU 1. The KBC 5 is a keyboard controller and controls key input from the keyboard 9 and a pointing device (not shown in the drawing). The CRTC 6 is a CRT controller and controls display of the CRT 10. Further, the CRT 10 may be of course a liquid crystal monitor. The DKC 7 is a disk controller and controls access to the external memory 11 storing a boot program, various applications, font data, a user file, an edit file, and a printer control command generation program (hereinafter, referred to as a printer driver). The external memory 11 is composed of, for example, a hard disk (HD).

The PRTC 8 is a printer controller, which is connected to the printer 200 via a two-way interface and executes a communication control process with the printer 200.

Further, the CPU 1 executes, for example, an expansion process (rasterization) of outline font to a display information RAM set on the RAM 2 and enables WYSIWYG on the CRT 10. Further, the CPU 1, on the basis of a command instructed by the mouse cursor on the CRT 10, opens various registered windows and executes various data processes. A user, when executing printing, opens the window concerning setting of printing and sets the print process for the printer driver including setting of the printer and selection of the print mode.

Figure 3:
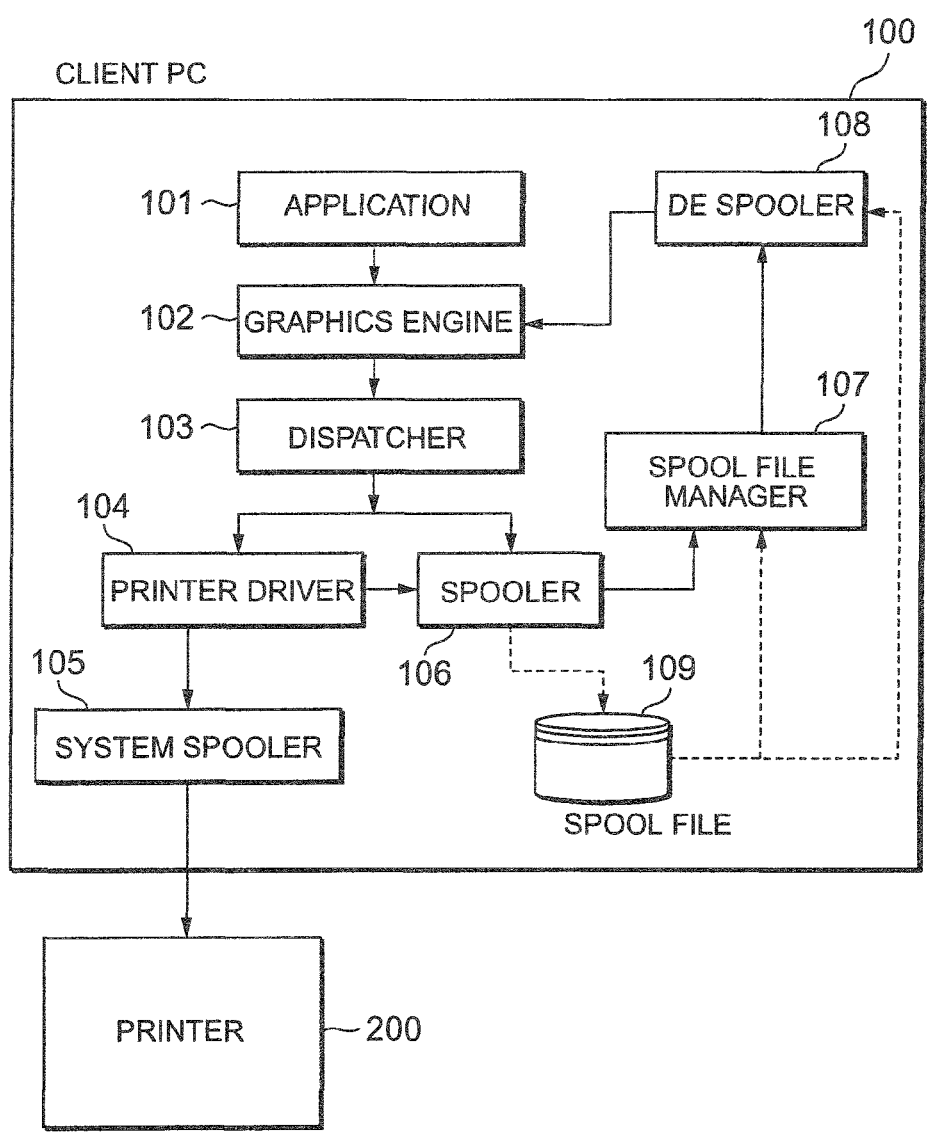
FIG. 3 is a block diagram showing the function constitution of a print process of the client personal computer relating to the embodiment of the present invention.

FIG. 3 is a block diagram showing the function constitution of the print process of the client personal computer 100. Needless to say, the above function constitution can be properly changed if the function of the present invention is executed. An application 101, a graphics engine 102, a printer driver 104, and a system spooler 105 exist as files preserved in the external memory 11 and are program modules, when they are to be executed, which are loaded into the RAM 2 and executed by the OS and a module using the module thereof. The application 101 and the printer driver 104, via, for example, a CD-ROM or a network (both are not drawn) of the external memory 11, can be added to the hard disk of the external disk 11. The application 101 stored in the external memory 11 is loaded into the RAM 2 and executed. However, when printing data for the printer body 200 from the application 101, the data is outputted (drawn) using the graphics engine 102 which is executably loaded into the RAM 2. The graphics engine 102 loads the printer driver 104 prepared for each printer into the RAM 2 from the external memory 11 and converts the output of the application 101 to a control command of the printer using the printer driver 104. The converted printer control command, via the system spooler 105 loaded in the RAM 2 by the OS, is outputted to the printer body 200 via the interface 21.

To release the application 101 from the print process in a short time, when sending a print command from the graphics engine 102 to the printer driver 104, a constitution of generating a spool file 109 composed of an intermediate code can be realized once. At the point of time when a spooler 6 outputs all print commands from the graphics engine 102 to the spool file 109, the application is released. Further, in the constitution shown in FIG. 3, for contents of the spool file 109, the processing such as changing the print order of pages and rotating and outputting print data can be performed.

Generally, to process print data, setting is executed from the window (user interface) provided by the printer driver 104 and the printer driver 104 stores the set contents in the RAM 2 or the external memory 11.

Print data is prepared by the printer driver 104 installed in the client personal computer 100 and is transmitted to the printer 200. The printer driver 104, using an SNMP (simple network management protocol) which is a protocol for collecting, managing, and monitoring information of the devices connected to the network via the network, can obtain MIB (management information base) information from the printer 200.

On the other hand, the printer 200 always stores the latest residual quantity count managed by the residual quantity counter 202 of sheets of paper as MIB information and when requested from the client personal computer 100 connected, it is structured so as to be transmitted and referred to.

In the device corresponding to the SNMP, an interface for accessing the management information area preserving the information of the device is provided. This interface is an SNMP agent. Information preserved in the management information area varies with the device. When it is a network printer as in this embodiment, the status of the printer, information of sheets of paper, and the residual quantity of toner are preserved in the management information area. To obtain information of the device to be managed loading the SNMP agent, on the client personal computer 100 on the host computer side, an SNMP manager is installed. The SNMP agent preserves the management information in a data base called an MIB (management information base) and upon request of the manager, transmits necessary information from the MIB. The SNMP manager has a function for communicating with the SNMP agent and obtaining and setting internal information of each device. The SNMP manager can pull out traffic information of the devices, thereby can easily obtain information such that how high the traffic is in what time zone.

A network manager can manage all information of the network printer arranged on the network at one place.

A user, when adding sheets of paper to each paper feed cassette 201, via the display means 203 and the UI processing means 204, designates the number of additional sheets of paper from the sheets of paper setting screen for the paper feed cassettes shown in FIG. 4, thereby updates the residual quantity counter 202 of sheets of paper. In the example shown in FIG. 4, it is found that 500 sheets of paper are added to a paper feed cassette N and as a result, the number of residual sheets of paper of the sheets of paper stored in the paper feed cassette N is 500 sheets. The user presses the OK button and confirms it.

This counter value is subtracted by the number of outputted sheets of paper whenever sheets of paper are outputted from the paper feed cassette 201 and is added by the number of added sheets of paper whenever sheets of paper are added, so that the residual quantity counter is structured so as to always show the residual quantity of sheets of paper of the paper feed cassette 201 at the present time.

Further, for detection of the residual quantity of sheets of paper, as indicated in this embodiment, the present invention is not limited to a case that a user beforehand decides the number of sheets of paper and adds sheets of paper to the paper feed cassette and needless to say, the aforementioned method may be used.

At the time of printing, the printer driver 104 installed in the client personal computer 100 prepares print data and calculates the number of sheets of paper of a necessary size for printing. Next, the printer driver 104, on the basis of the paper size designated by a user or information on designation of a paper feed cassette, identifies the paper feed cassette 201. Then, the printer driver 104 refers to the MIB information of the printer 200, thereby obtains the residual quantity information of sheets of paper of each paper feed cassette 201, and judges whether sheets of paper of the designated paper size remain more than the number of necessary sheets of paper for printing calculated before in the designated paper feed cassette 201 of the printer 200 or each paper feed cassette 201 of the printer 200. When a sufficient number of sheets of paper is set, the printer driver transmits the print data as it is to the printer 200 to start printing. In the corresponding paper feed cassette 201 (in a case of automatic selection and setting of paper feed cassettes, the total of all paper feed cassettes in which sheets of paper are set), the necessary number of sheets of paper is not set and when the printer driver 104 judges that a shortage of the number of sheets of paper occurs, it displays a pop-up message as shown in FIG. 5, notifies the effect to the user, and requests a correspondence.

In this embodiment, a user can preset three corresponding methods.

For example, the first method is a method for straight transmitting data to the printer 200 without doing anything, and there is no need to spool all print data on the client personal computer by the printer driver 104, and the method is used when printing data by the conventional method.

The second method is a method for displaying a pop-up message on the client personal computer 100. At the sight of the message, a user continues straight the process, or adds sheets of paper and then starts printing, or cancels once the printing and switches the print destination to another printer.

Third method is a method for only displaying a message on the spooler, straight sending print data to the printer 200, and continuing the printing and although an error message screen is troublesome popped up every time, the method is used when requesting to know information whenever he wants to see.

FIG. 5 shows an example of the pop-up message screen and shows the possibility of an occurrence of exhaustion of sheets of paper during execution of the print job and that a user can select a countermeasure. The printer driver 104 in this embodiment displays a GDI as shown in FIGS. 4 and 5 on the CRT 10.

In the example of the pop-up message screen shown in FIG. 5, when there is a possibility of an occurrence of exhaustion of sheets of paper during execution of the print job, a user can select continuation or cancellation of the printing.

When execution of printing is instructed after the aforementioned designation, the print command issued from the application 101 is transferred to the spooler 106 via the graphics engine 102 and the dispatcher 103. The spooler 106 converts the received print command to an intermediate code, outputs it to the spool file 109, obtains the processing setting (for example, the number of sheets of paper of size A4 to be printed is 1 and the number of sheets of paper of size A3 to be printed is 3) concerning the print data which is set in the printer driver 104 from the printer driver 104 and preserves it in the spool file 109.

The spool file manager 107 loads the de spooler 108 stored in the external memory 11 into the RAM 2 and instructs the de spooler 108 to perform the print process of the intermediate code by the processing setting described in the spool file 109.

The print setting data set by a user is stored in a memory called a Devmode structure.

The process in this embodiment is started when a user operates the keyboard 9 shown in FIG. 1, thereby designates the printer at the print destination by the application 101 in execution, and instructs execution of printing.

When the user presses the print button on the application, a print job start command is called to the printer driver via the GDI (graphics device interface) and the printer driver prepares print data. At this time, the printer driver, for example, every setting of the print size and run, refers to the print setting stored in the Devmode structure and prepares print data. When this is finished, job end is called from the printer driver and the GDI opens the printer driver and transfers the prepared print data to the OS.

FIG. 6 shows a screen example of the print spooler displayed on the client personal computer when the client personal computer executes the print job. In the example shown in FIG. 6, there are four print jobs and for each print job, the owner, print data size, and present status are displayed. The example shows that in the jobs 1 to 3, sheets of paper are sufficient, while in the job 4, there is the possibility of shortage of predetermined sheets of paper.

Figure 7:
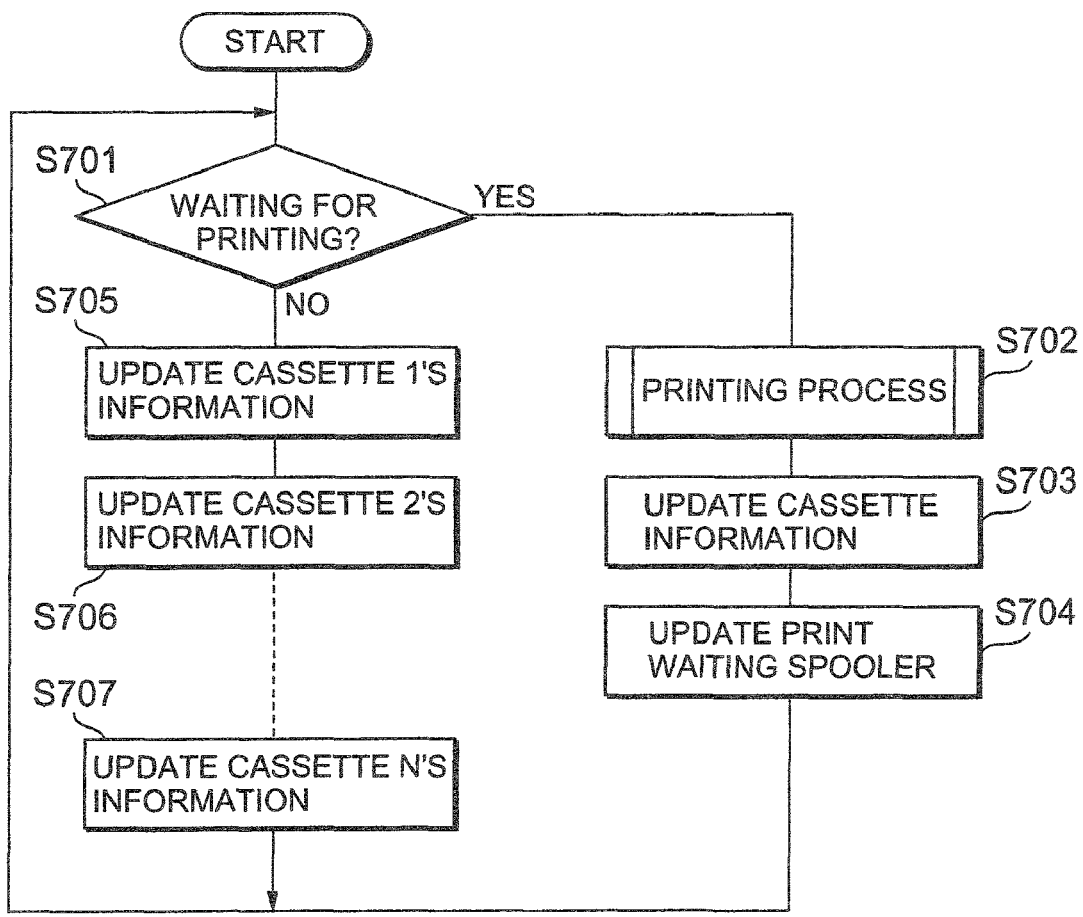
FIG. 7 is a flow chart showing control of the printer side relating to the embodiment of the present invention.

Next, the process by the printer driver of the print system of this embodiment will be explained by referring to the flow chart shown in FIG. 7.

Firstly, at Step S701, the printer driver judges whether there is data waiting for printing or not. When there is data waiting for printing, the process goes to Step S702 and when there is no data waiting for printing, the process goes to Step S705.

At Step S702, the print process is performed and the print driver generates print data. With respect to the print setting and run setting, the ones preserved in the setting area of the Devmode structure are used.

When the print process is finished, next, the process goes to Step S703.

At Step S703, the paper feed cassette information is updated. Next, the print waiting spooler information is updated (Step S704).

At Step S705, the information of the paper feed cassette 1 is updated. Continuously, the information of the paper feed cassette 2 is updated (Step S706) and the information of the paper feed cassette N is updated (Step S707).

Figure 8:
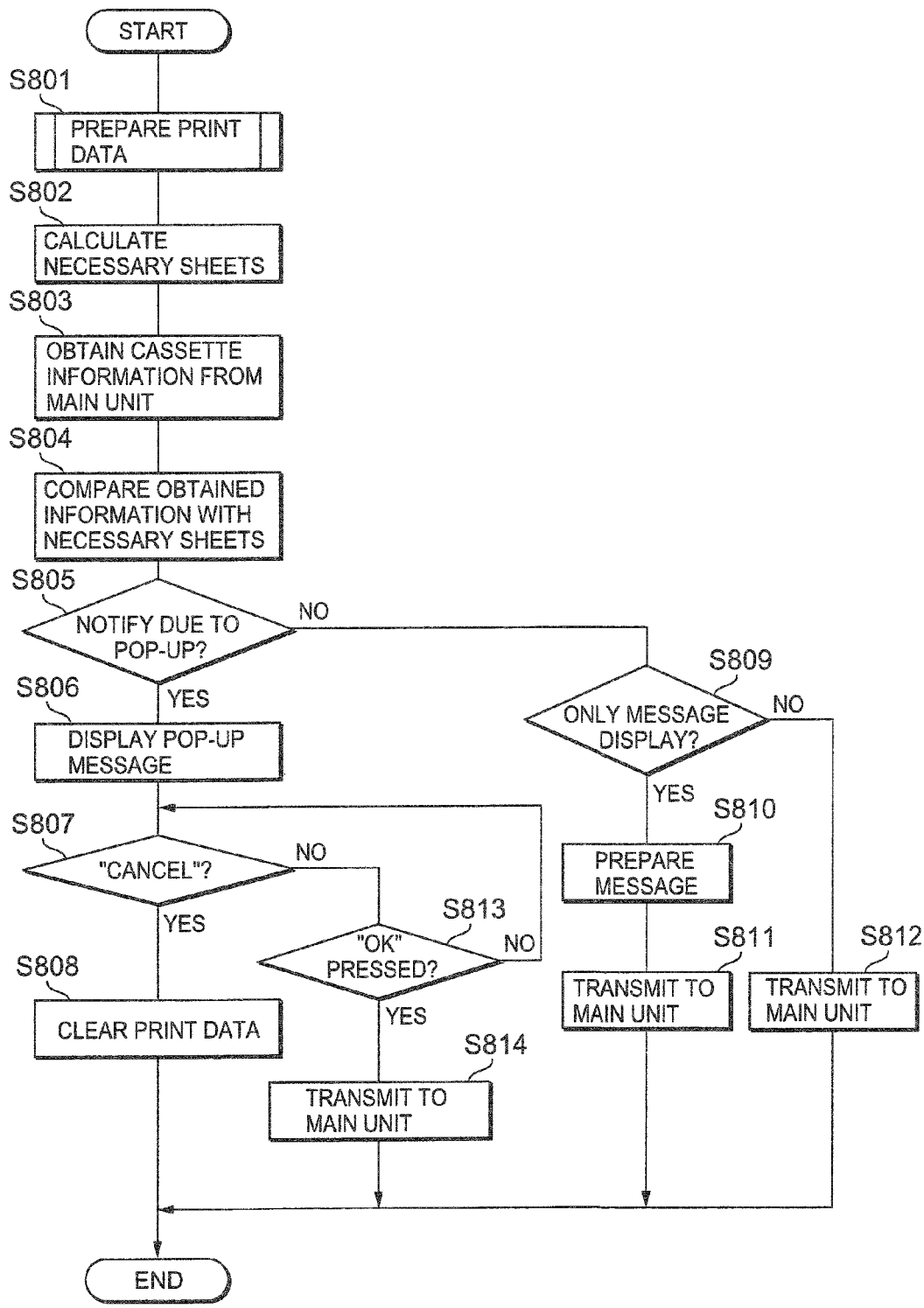
FIG. 8 is a flow chart showing control of the client personal computer side relating to the embodiment of the present invention.

Next, an example of the control of the client personal computer will be explained according to the flow chart shown in FIG. 8.

Firstly, at Step 801, the client personal computer prepares print data.

Next, it calculates the number of necessary sheets of paper (Step S802).

At Step S803, it obtains paper feed cassette information from the main unit.

Next, it compares the input information with the necessary run (Step S804).

At Step S805, it judges notification due to pop-up or not.

In a case of notification due to pop-up, it displays a pop-up message (Step S806) and in a case of no notification due to pop-up, the process jumps to Step S809.

Next, at Step S807, it judges whether the contents of the pop-up message are cancel or not.

When the contents are cancel, it clears the print data (Step S808) and when the contents are not cancel, the process jumps to Step S813.

At Step S809, it judges whether the pop-up notification contents are only the message display or not. When the contents are only the message display, it prepares a message (Step S810) and transmits the prepared message to the main unit (Step S811) and the control of the client side is finished.

When the contents are not only the message display, it transmits the effect to the main unit (Step S812) and the control of the client side is finished.

At Step S813, it judges whether OK is pressed or not. When OK is pressed, it transmits the effect to the main unit (Step S814) and the control of the client side is finished. When OK is not pressed, the process jumps again to Step S807.

As mentioned above in detail, according to the embodiment of the present invention, whether a shortage of sheets of paper occurs during printing or not can be known from the client personal computer before actually starting printing.

Further, even in a status that a plurality of print jobs are spooled on the same apparatus, a user, before his turn that his print job is actually processed comes, can find whether a shortage of sheets of paper occurs or not. By doing this, the time loss required for recovery when exhaustion of sheets of paper occurs during printing can be avoided, or the output destination of print data is switched to another printer before starting printing, thus output results can be obtained when necessary, or changing of the paper quality during output due to addition of sheets of paper during printing can be avoided.

It goes without saying that various obvious modifications and simple variants come within the scope of the present invention beyond the above-described embodiment.

What is claimed is:

1. An image forming apparatus comprising:
a receiving unit configured to receive a number of papers added to a cassette;
a storage unit configured to store a residual quantity information of paper per paper size renewed with the number of papers received by the receiving unit;
a communication unit configured to transmit the residual quantity information to a client computer so that the client computer notifies an occurrence of exhaustion of paper to a user before sending a print job created by the user in the client computer to the image forming apparatus when judging the occurrence of exhaustion of paper during printing the print job by the image forming apparatus based on a comparison results between the residual quantity information and a number of papers necessary for the print job.

2. The apparatus according to claim 1, wherein further comprising: a plurality of cassettes and a switching unit configured to switch a paper feed destination to another cassette when papers in one cassette are exhausted.

3. The apparatus according to claim 2, wherein the cassettes store paper in different directions.

4. The apparatus according to claim 1, wherein the storage unit is a nonvolatile and presettable memory.

5. The apparatus according to claim 1, wherein further comprising: a display unit configured to display operation contents of the user and status of the apparatus.

6. The apparatus according to claim 1, wherein further comprising: a user interface processing unit configured to interface with an instruction and input from the user.

7. The apparatus according to claim 1, wherein the occurrence of exhaustion of paper will occur in the middle of image forming is displayed on a display of the client computer.

8. The apparatus according to claim 1, wherein when displaying that the occurrence of exhaustion of paper will occur, an option of whether the print job is executed or not is displayed.

9. An image forming apparatus comprising:
receiving means for receiving a number of papers added to a cassette;

storage means for storing a residual quantity information of papers per paper size renewed with the number of papers received by the receiving means;

communication means for transmitting the residual information to a client computer so that the client computer notifies an occurrence of exhaustion of paper to a user before sending a print job created by the user in the client computer to the image forming apparatus when judging the occurrence of exhaustion of paper during printing the print job by the image forming apparatus based on a comparison results between the residual quantity information and a number of papers necessary to print the print job.

10. The apparatus according to claim 9, wherein further comprising: a plurality of cassettes and a switching means for switching a paper feed destination to another cassette when papers in one cassette are exhausted.

11. The apparatus according to claim 10, wherein the cassettes store paper in different directions.

12. The apparatus according to claim 9, wherein the storage means is a nonvolatile and presettable memory.

13. The apparatus according to claim 9, wherein further comprising: a display means for displaying operation contents of the user and status of the apparatus.

14. The apparatus according to claim 9, wherein further comprising; a user interface processing unit configured to interface with an instruction and input from the user.

15. The apparatus according to claim 9, wherein the occurrence of exhaustion of paper will occur in the middle of image forming is displayed on a display of the client computer.

16. The apparatus according to claim 9, wherein when displaying that the occurrence of exhaustion of paper will occur, an option of whether the print job executed or not is displayed.

17. A method performed by an image forming apparatus, comprising:

receiving a number of papers added to a cassette;

storing a residual quantity information of papers per paper size renewed with the number of papers added;

transmitting the residual quantity information to a client computer so that the client computer judges an occurrence of exhaustion of paper will occur during printing a print job created by a user based on a comparison results between the residual quantity information and a number of papers necessary for the print job and notifies the occurrence of exhaustion of paper to the user before sending the print job to the image forming apparatus.

18. The method according to claim 17, further comprising: displaying that the occurrence of exhaustion of paper will occur in the middle of image forming on a display of the client computer.

* * * * *